Feb. 11, 1969   A. H. MARK ET AL   3,426,760
TOOTHED CONICAL THRESHING ASSEMBLY
Filed Nov. 23, 1965   Sheet 1 of 2
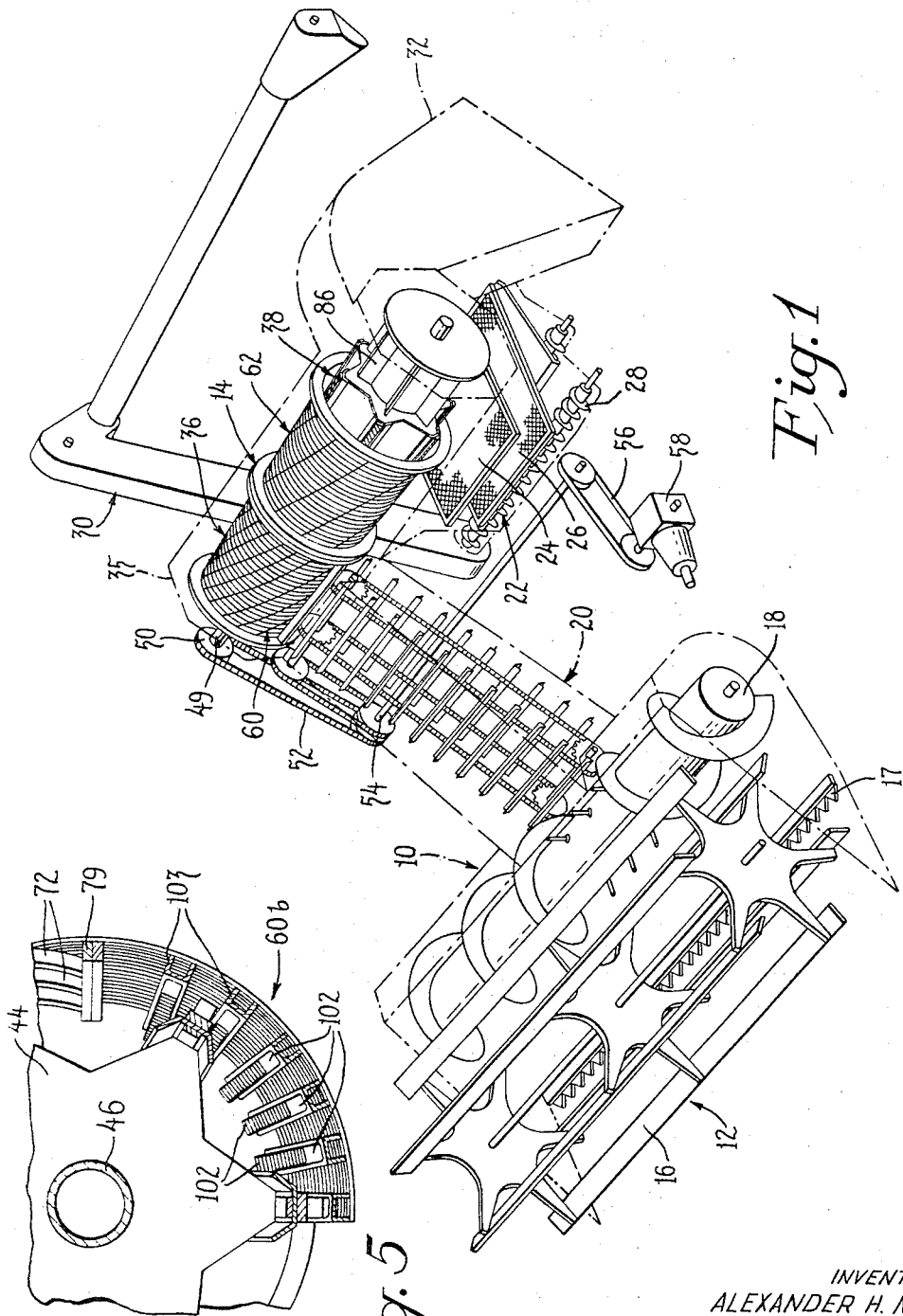
INVENTORS.
ALEXANDER H. MARK &
JOSEPH NECAS
BY Tweedale & Gerhardt
ATTORNEYS.

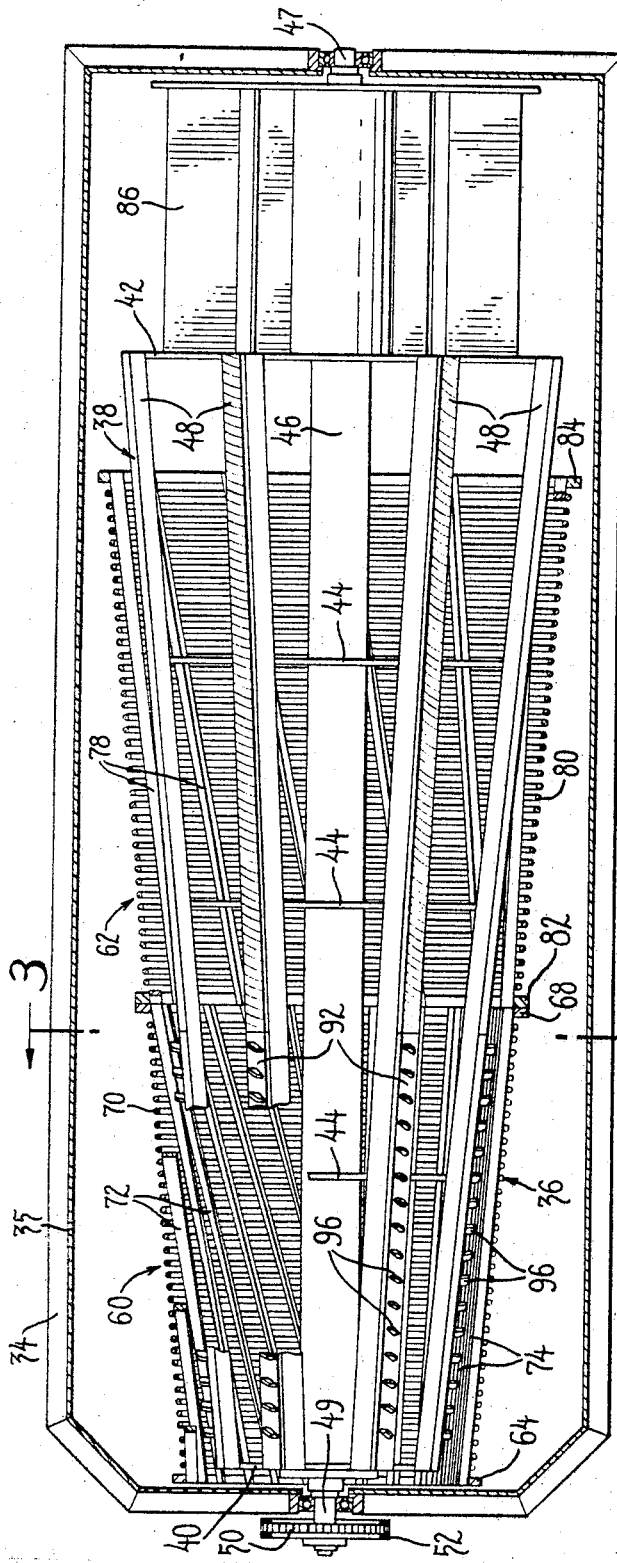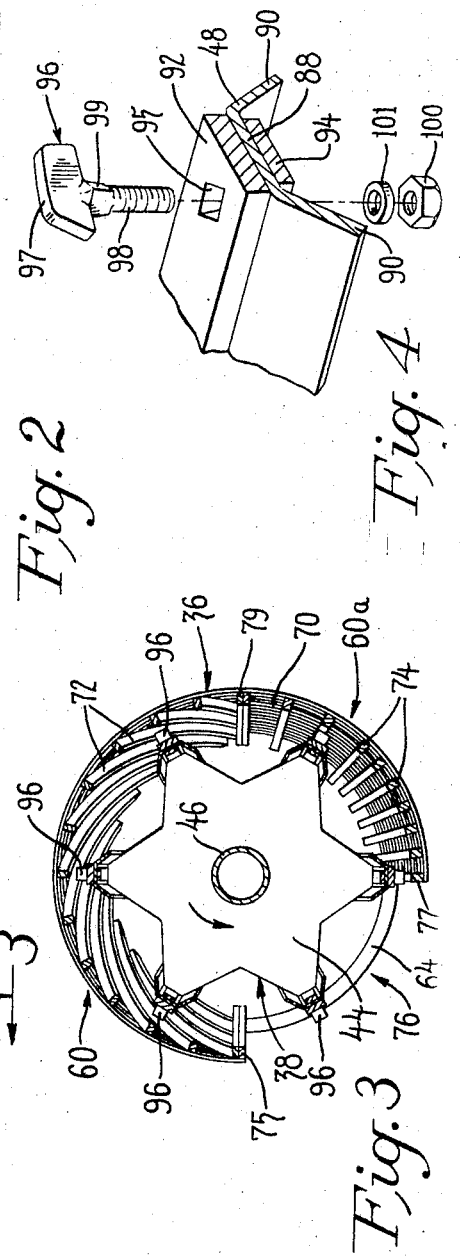
INVENTORS.
ALEXANDER H. MARK &
JOSEPH NECAS
Tweedale & Gerhardt
ATTORNEYS.

3,426,760
TOOTHED CONICAL THRESHING ASSEMBLY
Alexander H. Mark, Livonia, Mich., and Joseph Necas, Toronto, Ontario, Canada, assignors to Massey-Ferguson Inc., Detroit, Mich.
Filed Nov. 23, 1965, Ser. No. 509,395
U.S. Cl. 130—27               4 Claims
Int. Cl. A01f 7/02, 12/22; A01d 41/12

ABSTRACT OF THE DISCLOSURE

A threshing assembly includes a conical concave enclosing a conical cylinder having axially extending peripheral bars provided with angled spike teeth. Straight flights, which may include spike teeth, are provided on a portion of the small end of the concave adjacent the crop material opening. These teeth cooperate with the straight flights to thresh most of the crop material. Spiral flights are mounted on the remainder of the concave inner surface and cooperate with the cylinder bars in propelling the crop material axially of the concave with increased centrifugal force to further separate the grain from the crop material.

---

This invention relates generally to agricultural grain separating apparatus and is particularly concerned with a toothed threshing unit having a conical cylinder and concave.

In conventional combine harvesters, the threshing mechanism includes a cylinder and concave which cooperate to partially separate the grain from the straw and chaff. The partially separated mixture of straw and grain is then fed from the concave onto straw walkers for the final separating step. As the material is agitated either on the concave or straw walkers, the grain is separated by gravity from the harvested mass of material. For some grains such as rice, it has been conventional to provide spikes or teeth on the cylinder to increase the capacity of the threshing unit. However conventional spike cylinders must operate at high r.p.m. in order to obtain an economical rate of feed and, as a result, damage to the grain kernels during the threshing operation is high. Furthermore, the damage to the grain kernels increases when dry grains are threshed with a conventional spike cylinder or concave.

In accordance with the present invention, a conical, transverse cylinder having axially extending peripheral bars is enclosed coaxially within a conical concave. The cylinder rotates in the concave, and the cylinder bars cooperate with the inner surface of the concave to agitate the harvested crop material fed therein and centrifugally separate the grain from the straw through openings in the concave. The material is fed into the concave radially, or from the side adjacent its smaller end, and helical or spiral flights or guide bars on the inner surface of the concave cooperate with the cylinder bars to cause the material to advance axially toward the larger discharge end of the threshing unit. Spike teeth are mounted on either the concave or cylinder bars, or both, to provide a more positive threshing action on the crop material. With the conical configuration of the cylinder and concave, as the crop material travels along the conical cylinder surface from the small end of the unit, the peripheral speed and hence the centrifugal force acting on the grain increases to separate the tougher kernels from the stalks and more effectively separate kernels which are lodged in the straw. With the conical configuration of the cylinder and concave, the cylinder may rotate at lower speeds than is the case with conventional threshing units and still get the same rate of feed. The spikes are arranged so as to give a more positive feeding action to advance the crop material axially from the inlet to the discharge end. Consequently, with the slower speed of the cylinder, the damage to the kernels is reduced substantially even with dry grains. With the present invention, the cylinder can, for example, operate at 500 to 750 r.p.m. as compared with 900 to 1100 r.p.m. with conventional threshing assemblies and still get the same rate of feed. It should be understood however, that the cylinder speed is not limited to speed ranges between 500 and 750 r.p.m. The spikes are preferably formed with a flat, elongated head which is angled with respect to the axis of the threshing unit to deflect the crop material axially along the threshing unit during rotation of the cylinder. Moreover, the spikes are preferably aligned in a helical manner on successive bars of the cylinder such that the theoretical line joining the spikes follows a helical pattern as the cylinder rotates. To further assist the feeding action of the threshing unit, the helical guide bars on the inner surface of the conical concave increases the rate at which the material can be fed into the threshing unit.

Preferably, a plurality of straight flights are provided on a segmental portion of the inner surface of the concave to be encountered by the crop material immediately upon its entry into the concave. The straight flights extend axially along the concave in the quadrant immediately adjacent the feed opening and the cylinder rotates in a direction such that the crop material initially encounters the straight flights. Preferably the straight flights are provided with spikes projecting inwardly toward the cylinder bars to cooperate with the spikes on the cylinder bars and increase the threshing action. Consequently, the major portion of the grain is separated at the straight flights and the tougher kernels are separated as the material advances toward the larger end of the concave to increase the centrifugal force acting on the material. Preferably, the segmental portion of the concave having the straight flights is removable such that the section can be replaced by one in which the spikes are omitted.

The objects, advantages and features of the invention will become apparent from the following description taken in connection with the accompanying drawings in which:

FIG. 1 is a partial perspective view of a combine harvester having a threshing assembly embodying the invention;

FIG. 2 is an enlarged, longitudinal sectional view through the threshing unit;

FIG. 3 is a transverse sectional view of the threshing unit taken substantially along line 3—3 of FIG. 2;

FIG. 4 is a view similar to FIG. 3 showing a segment of the concave having spikes.

FIG. 5 is a modification of the structure shown in FIG. 3.

In FIG. 1, reference numeral 10 designates collectively a portion of a combine having a header assembly 12 and a threshing and separating assembly 14. Header assembly 12 includes a reel 16 for guiding standing crop material over a cutter bar 17 which is fed by an auger 18 into an elevator 20. The elevator 20 feeds the harvested material into threshing and separating assembly 14.

The grain is separated from the straw by the threshing and separating assembly 14 and is directed onto a cleaning assembly 22 including shaker shoes 24 and 26. A stream of air is directed over the shaker shoes to blow chaff and foreign material out with the straw through a discharge chute 32. Grain is collected beneath the shaker shoes and delivered by an auger 28 to a grain elevator and discharge spout assembly 30 which in turn delivers the grain into a storage area.

With reference to FIG. 2, the threshing unit 14 is supported within a housing 35 (illustrated in phantom in FIG. 1), on a frame 34 and includes a concave 36 and threshing cylinder 38. Cylinder 38 includes axially spaced end plates 40 and 42, and intermediate stiffener plates 44 through which extends a shaft 46. Supported on the periphery of plates 40, 42 and 44 is a plurality of axially extending bars 48 which preferably are serrated on their outer surface. Shaft 46 is secured to stub shafts 47 and 49 journalled in frame 34, and cylinder 38 is caused to rotate about the axis of shaft 46 by a drive pulley or sprocket 50 mounted on shaft 49. The pulley or sprocket 50 is driven by a belt or chain 52 from a shaft 54 (FIG. 1). Shaft 54 in turn is driven by a belt 56 from a transmission or drive unit 58 (FIG. 1). Cylinder 38 is of conical configuration having its small end toward the left in FIGS. 1 and 2 and its large end toward the right, that is, the diameter of the cylinder increases progressively from plate 40 to plate 42.

Cylinder 38 is axially enclosed by the conical concave 36 which, in the illustrated embodiment, is made up of two axial sections. The section forming the smaller end of the conical concave is designated by reference numeral 60, and the section forming the larger end of the conical concave is indicated by reference numeral 62. Section 60 is made up of axially spaced annular end frame members 64 and 66 which support a screen 70. In the illustrated embodiment, screen 70 is made up of rolled wire, the space between adjacent coils permitting the grain to pass through the screen. Obviously, any screen or wire mesh of open grid work construction would be suitable. Extending along the inner surface of screen 70 along the length of section 60 is a plurality of helical or spiral guide bars or flights 72. A side inlet opening 76 is formed in section 60 adjacent its small end and a plurality of straight flights 74 extend axially along the inner surface of screen 70 adjacent opening 76.

Opening 76 extends over substantially the entire lower left quadrant of the conical concave section 60 as shown in FIG. 3 with its upper and lower edges defined by axial bars 75 and 77, respectively. The straight flights are spaced along the inner surface of a segmental portion 60a defined between bars 77 and a straight bar 79. As illustrated, portion 60a comprises the quadrant immediately following the lower edge 77 of opening 76. Hence, with cylinder 78 rotating in a counterclockwise direction (FIG. 3), bars 48 cause the crop material to initially encounter the straight flights 74 as it enters the concave through opening 76.

The helical flights 72 are mounted on the remaining portion of the inner surface of section 60, which portion is defined between bars 75 and 79 in FIG. 3, that is, the upper half of the concave section 60. Thus, as the crop material is carried around the concave section 60 by cylinder 38 in a counterclockwise direction, bars 74 cooperate with the cylinder to separate the major portion of the grain. As the crop material moves past segment 60a it encounters the helical flight 72 and is deflected axially along the concave toward section 62.

Section 62 of the concave is formed with axially spaced annular end frames 82 and 84 between which is supported a screen 80, similar to screen 70, and helical or spiral flights 78 are mounted on the inner surface of screen 80 along its length. When the crop material reaches the right end of section 62 as viewed in FIG. 2, the straw is discharged into chute 32 by a blower 86 mounted on the right end of shaft 46 of the cylinder.

Projecting from each of the cylinder bars 48 along the length enclosed by section 60 of the concave is a plurality of spaced teeth or spikes 96. With reference to FIG. 4, cylinder bars 48 each include a central base portion 88 having side flanges 90 extending radially inwardly from the sides thereof. Secured to the outer portion of the base portion 88 is an outer mounting strip 92, and an inner mounting strip 94 is secured to the inner side of base portion 88. A plurality of spaced, non-circular openings are provided in mounting strips 92 and 94 as well as in the base portion 88 of the cylinders bars 48 for receiving the teeth 96. Each of teeth 96 includes a generally flat, elongated head portion 97 and a shank portion 98 which is threaded to receive a nut 100 and washer 101. The base portion of the shank adjacent the head 97 is of the same configuration as the non-circular openings 95 as indicated at 99 such that the tooth 96, when mounted in the cylinder bar, is secured against rotation relative to the bars.

As the harvested crop material is fed into inlet opening 76 by elevator 20, bars 48 rotate in the direction of the arrow of FIG. 3, and the material is carried around the inner surface of concave section 60 where it first encounters the straight bars 74 and then the helical bars 72. The teeth 96 act to give a positive flailing or tumbling action to the crop material and the heads 97 are disposed at an angle to the bars such that they deflect the material axially toward the discharge end of the assembly. As the material is carried around the concave, the separated grain passes through screen 70 and is directed onto the shaker shoes 24 and 26. The harvested crop material is deflected further by bars 72 in an axial direction toward section 62 of the concave. As the material advances toward the right, the diameter of the concave increases and hence the peripheral speed of the material increases such that the centrifugal force acting on the material increases to separate the tougher kernels from the stems or stalks.

In the embodiment of FIG. 5, section 60a of FIG. 3 is removed and replaced by a section 60b having inwardly projecting teeth mounted on the straight flights 74 to further increase the threshing action. Teeth 102 are provided on straight concave flights 103, preferably made up of inverted channel sections, to cooperate with the teeth of the cylinder to further enhance the threshing operation.

While a specific embodiment of the invention has been illustrated and described, it will be apparent to those skilled in the art that various equivalents and alternatives in the construction and arrangement of parts is possible without departing from the scope and spirit of the appended claims.

We claim:
1. A threshing assembly for crop material including:
a rotatable conical cylinder having a plurality of spaced bars extending axially along its periphery,
a plurality of spikes mounted on the cylinder bars and angled with respect to the rotational axis of the cylinder,
a conical concave coaxially surrounding the cylinder and having an opening adjacent its smaller end through which crop material may be fed into the concave,
a plurality of peripherally spaced, axially extending straight flights mounted on a segmental portion of the concave inner surface adjacent said opening and extending less than the length of the concave, the straight flights cooperating with the spikes to separate grain from the stalks of crop material during cylinder rotation, and
a plurality of spaced spiral flights mounted on the remainder of the concave inner surface, and cooperable with the spikes to deflect the crop material axially toward the larger end of the concave and progressively increase the centrifugal force on the crop material to further separate the grain from the stalks.

2. A threshing assembly as defined in claim 1, wherein the opening is formed in the surface of the concave at its smaller end, thus enabling the crop material to be fed into the concave in a direction transverse to the common axis of the concave and cylinder.

3. A threshing assembly as defined in claim 1 wherein said spikes each include a threaded shank mounted in non-circular openings in said cylinder bars and a non-circular portion being formed on the shank for preventing rotation of the spike with respect to the cylinder bars.

4. A threshing assembly as defined in claim 1 including a plurality of spikes spaced along the length of each of said straight flights.

References Cited

UNITED STATES PATENTS

| | | | |
|---|---|---|---|
| 1,770,792 | 7/1930 | Lizamore | 130—6 |
| 2,321,019 | 6/1943 | Dray | 130—27.8 |
| 2,626,611 | 1/1953 | Nixon | 130—6 |
| 3,212,243 | 10/1965 | Mark et al. | 130—27.8 |
| 3,306,302 | 2/1967 | Mark et al. | 130—27.8 |

ANTONIO F. GUIDA, *Primary Examiner.*

U.S. Cl. X.R.

56—21